Nov. 1, 1932.  C. E. SCHOENBORN  1,885,871
TWO-WHEEL DRIVE DIFFERENTIAL
Filed Aug. 1, 1931  5 Sheets-Sheet 1
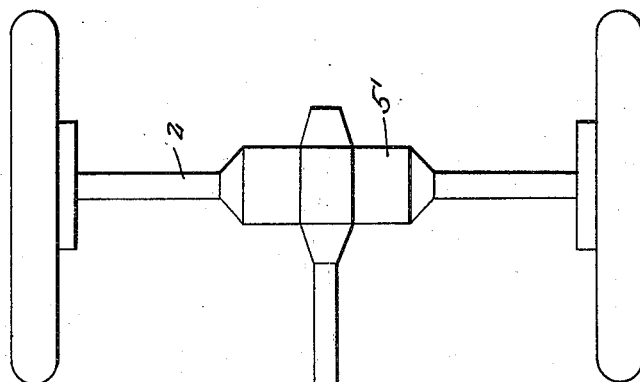
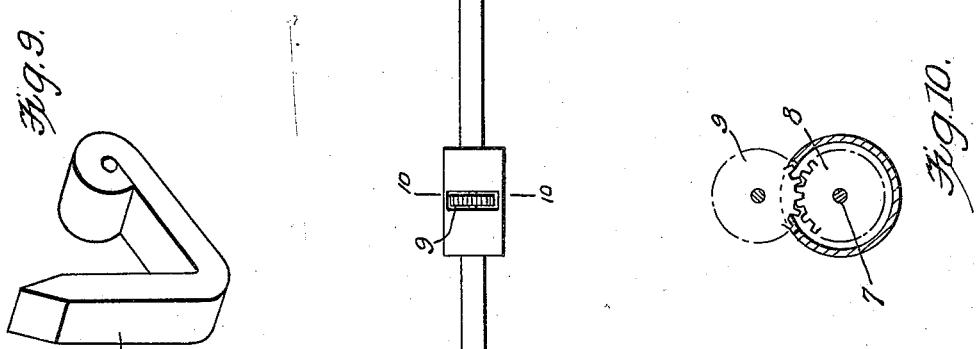
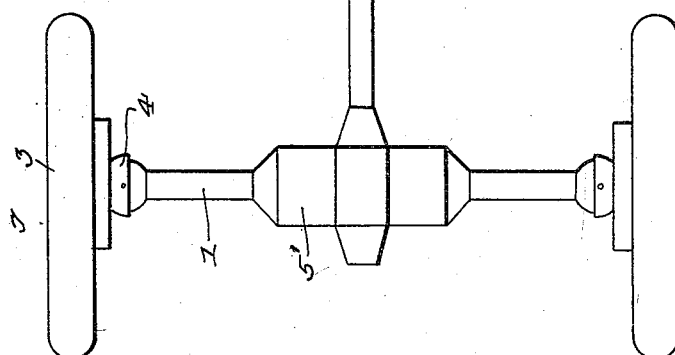
Inventor
Clarence E. Schoenborn,
By Clarence A. O'Brien
Attorney Nov. 1, 1932. C. E. SCHOENBORN 1,885,871
TWO-WHEEL DRIVE DIFFERENTIAL
Filed Aug. 1, 1931  5 Sheets-Sheet 2
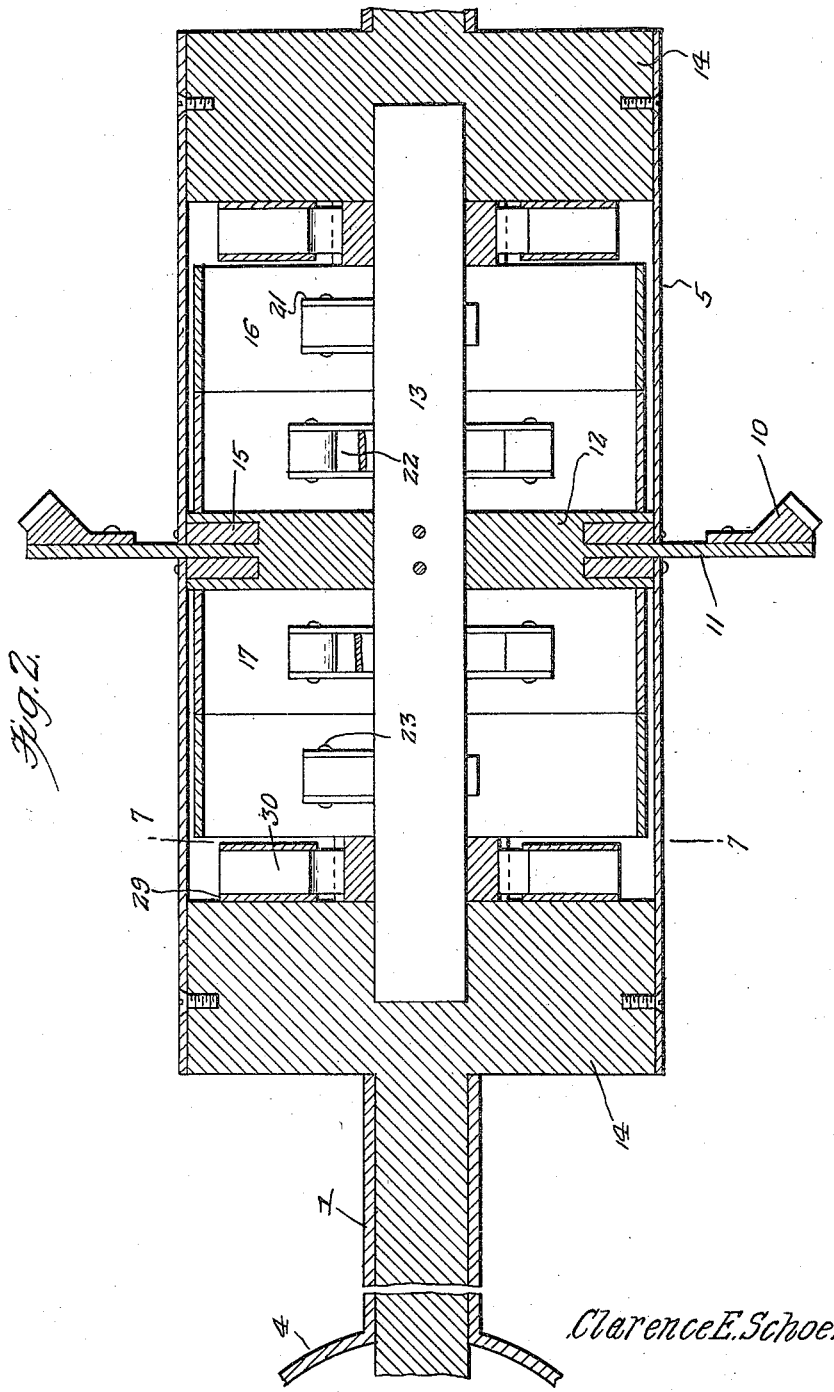
Inventor
*Clarence E. Schoenborn,*
By *Clarence A. O'Brien*
Attorney Nov. 1, 1932.    C. E. SCHOENBORN    1,885,871
TWO-WHEEL DRIVE DIFFERENTIAL
Filed Aug. 1, 1931    5 Sheets-Sheet 3
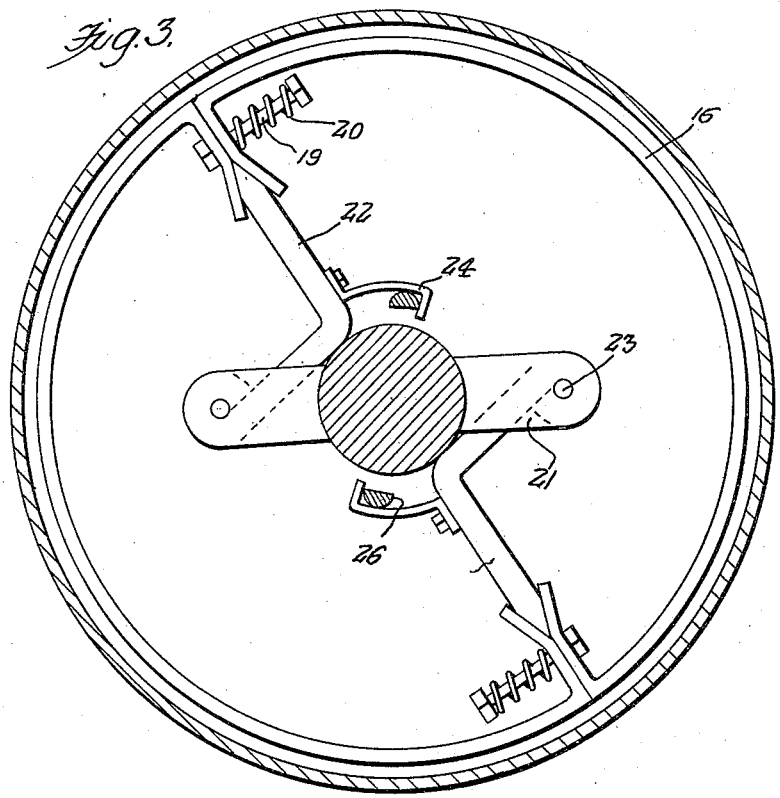
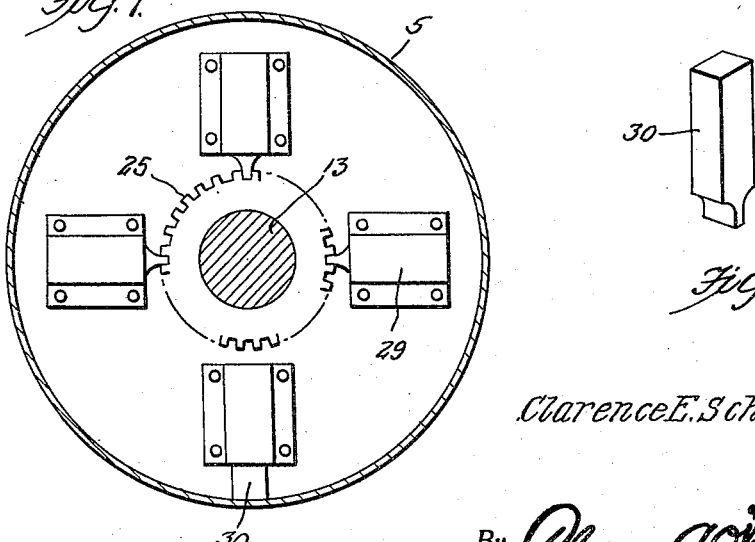
Inventor
Clarence E. Schoenborn,
By *Clarence A. O'Brien*
Attorney Nov. 1, 1932. C. E. SCHOENBORN 1,885,871
TWO-WHEEL DRIVE DIFFERENTIAL
Filed Aug. 1, 1931 5 Sheets-Sheet 4
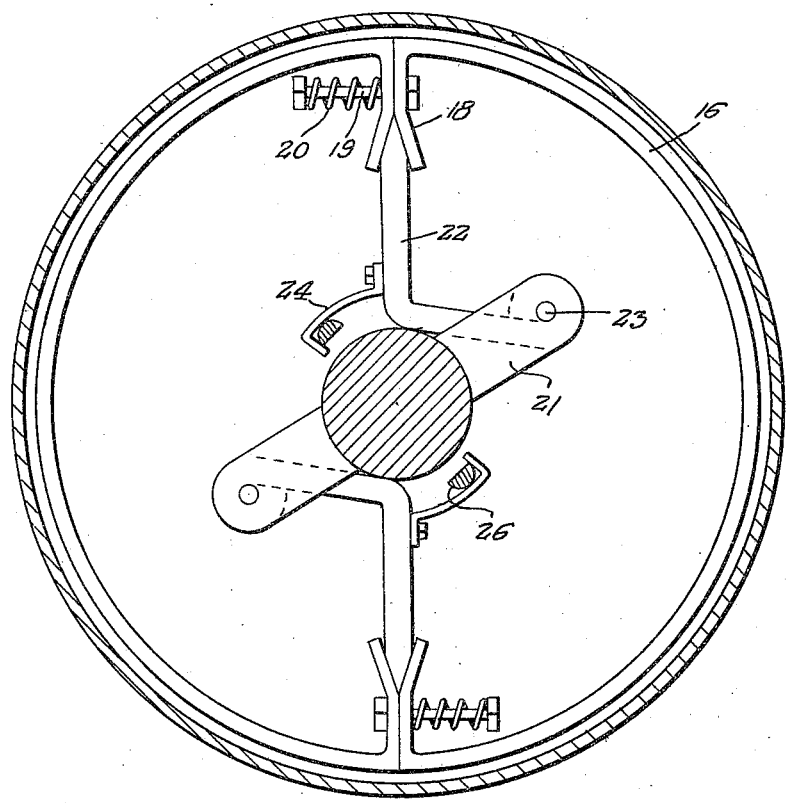
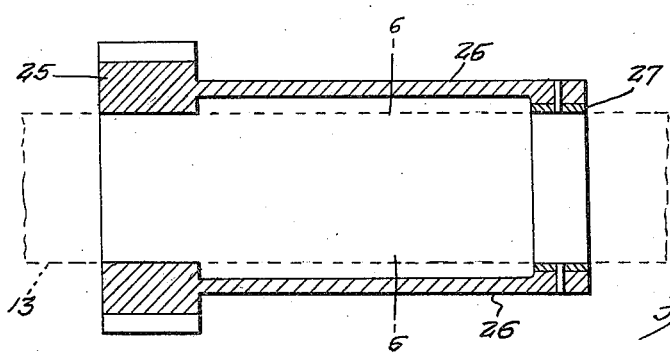
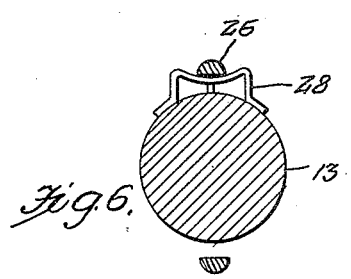
Inventor
Clarence E. Schoenborn,
By *Clarence A. O'Brien*
Attorney Nov. 1, 1932.   C. E. SCHOENBORN   1,885,871
TWO-WHEEL DRIVE DIFFERENTIAL
Filed Aug. 1, 1931   5 Sheets-Sheet 5

Inventor
Clarence E. Schoenborn,

By Clarence A. O'Brien
Attorney

Patented Nov. 1, 1932

1,885,871

UNITED STATES PATENT OFFICE

CLARENCE E. SCHOENBORN, OF CONKLIN, MICHIGAN

TWO WHEEL DRIVE DIFFERENTIAL

Application filed August 1, 1931. Serial No. 554,536.

This invention relates to a two wheel drive differential, the general object of the invention being to provide differential means for the wheels of the vehicle which are so constructed and arranged as to provide efficiency, quicker pick-up, permits the vehicle to readily pass through snow, mud or the like, without the wheels spinning, and provides free wheeling to a certain extent.

This invention also consists in certain other features of construction and in the combination and arrangement of the several parts, to be hereinafter fully described, illustrated, in the accompanying drawings and specifically pointed out in the appended claims.

In describing the invention in detail, reference will be had to the accompanying drawings wherein like characters denote like or corresponding parts throughout the several views, and in which:—

Figure 1 is a plan view showing the invention in use on the front and rear axles of a vehicle, the chassis body of the vehicle being omitted.

Fig. 2 is a longitudinal sectional view through one of the differential means.

Fig. 3 is a transverse sectional view through Fig. 2, with most of the parts in elevation and showing one of the shoe assemblies.

Fig. 4 is a similar view, but showing another shoe assembly.

Fig. 5 is a sectional view through one of the cog wheels and through a pair of the driving irons.

Fig. 6 is a section on the line 6—6 of Fig. 5.

Fig. 7 is a section on the line 7—7 of Fig. 2.

Fig. 8 is a view of one of the dogs.

Fig. 9 is a view of one of the driving wedges.

Fig. 10 is a section on the line 10—10 of Fig. 1.

Figure 11:
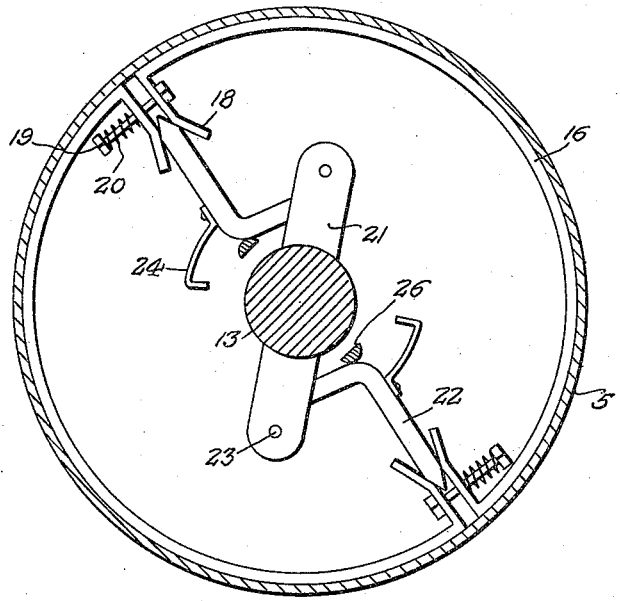
Fig. 11 is a view similar to Fig. 3 but showing the parts in driving position.

Referring to the drawings, the numeral 1 indicates the front axle and the numeral 2 the rear axle and the numeral 3 indicates the wheels connected to the shafts in the axles, the front wheels being rotatably connected to the ends of the axle 1, as shown generally at 4, so that these wheels can be used in steering.

The numeral 5' indicates the differential housing associated with each axle and the numeral 6 indicates the drive shaft axle housing the shaft 7 in which has a gear 8 attached thereto which meshes with a gear 9 which is driven in any suitable manner from the power plant of the vehicle. A gear is connected to each end of the drive shaft, said gear not being shown, and each gear meshes with a ring gear 10 on a member 11 extending into the cylinder 5 located in the housing 5' and attached to a disk 12 which is fastened to a shaft 13 rotatably arranged in the end pieces 14 of the cylinder 5 and to which the drive shafts of the wheels are connected. As shown in Fig. 2, the cylinder 5 is composed of two sections, with the member 11 located between the adjacent ends of the two sections and a ring 15 is connected to the inner end of each section and engages an annular groove in the member 12.

A pair of shoes 16 is located in one section of the cylinder, and a pair of shoes 17 are arranged in the other section, each shoe being formed of two sections which have inwardly extending ends 18, the extremities of which diverge, and the two sections are connected together by the bolts 19 carrying the springs 20, which act to yieldingly hold the ends of the two sections together as clearly shown in Fig. 4.

A number of pairs of arms 21 are attached to the shaft 13, two pairs being provided for each shoe, and L-shaped wedge members 22 are pivoted between the outer ends of the pairs, one wedge member being pivoted between each pair of arms as shown at 23.

The wedge ends of these members 22 are adapted to engage between the diverging extremities of the shoes. Each member 22 has a hook 24 attached thereto.

A cog wheel 25 is located adjacent the inner end of each of the end members 14 and is carried by the shaft and is located between the member 14 and the outer shoe of each pair of shoes, and a pair of inwardly extending driving irons 26 is carried by each cog wheel. These irons are formed of spring metal, and at their inner ends are riveted to a collar 27 which encircles the shaft 13 and a substantially U-shaped spring 28 is fastened to the shaft and has its curved bight located under one of the members 26.

A plurality of guide members 29 are carried by each member 14 on its inner face, and wedge-shaped dogs 30 are slidably arranged in these guide members for engaging the cog wheels 25.

The driving irons 26 automatically governs the driving wedges 22.

The device operates in the following manner:

When the vehicle is standing still, some of the dogs 30 drop into engagement with some of the teeth of the cog wheels 25 so as to hold the cog wheels and the driving irons 26 stationary. One pair of driving wedges 22 of each set is oppositely arranged to the other pair of the sets as one pair acts to drive a cylinder section in one direction and the other pair acts to drive the cylinder section in the opposite direction.

When the motor is started the shaft 7 drives the gear 10 which in turn rotates the member 11 and the member 12 and as said member 12 is connected to the shaft 13, said shaft 13 rotates in the ends 14 of the sectional cylinder 5. The rotation of the shaft 13 causes the forward driving wedges 22 to ride over the irons 26 so that the irons force said wedges 22 outwardly as shown in Fig. 11 and thus these wedges will expand a pair of the shoes 16 and 17 to cause the shoes to grip the sections of the cylinder 5 with sufficient force to turn the cylinder which in turn will rotate the wheel axles or shafts to move the vehicle. During this operation the irons 26 will engage the hooks 24 of the reverse drive wedges 22 as shown in Figs. 3 and 4 so as to move these reverse wedges inwardly whereby the shoes 16 and 17 associated with said reverse wedges will not contact the cylinder. Of course when the shaft 13 is driven in a reverse direction, the reverse wedges 22 will be swung outwardly by the arms 26 to cause the shoes associated therewith to grip the cylinder as to rotate the wheels in a reverse direction and the forward wedges 22 will be moved inwardly by the irons 26 engaging the hooks 24 of said forward wedges.

Figure 12:
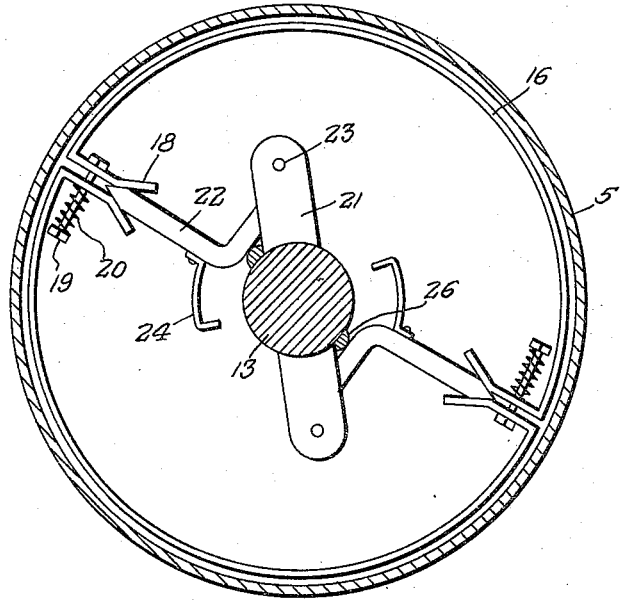
Fig. 12 is a view similar to Fig. 11, but showing the parts in a position during free wheeling.

As will be seen there is a space between the driving irons 26 and the axle 13 so that when the car goes faster than the motor, the cylinder gains speed over the driving shoes which causes the driving wedges 22 to draw together, permitting the driving shoe to come together so as to disengage them from the cylinder, the driving irons 26 being bent down close to the shaft 13 by the driving wedges during this operation as shown in Fig. 12. Thus a free wheeling action is secured but when the cylinder slows up or the motor picks up the spring action of the driving irons 26 pushes the driving wedges back into engagement with the shoes to expand the same and then the cylinder is driven by the motor. The same effect occurs when the vehicle is turning a corner the outside wheel having to go faster than the inside wheel the cylinder section which is connected with the said outside wheel will revolve faster than the shaft 13 so that the shoes which have been driving said cylinder section forwardly will be caused to push the wedges 22 inwardly to contract the driving irons 26, as shown in Fig. 12, so that the cylinder section of this outside wheel will revolve freely. When the wheels, the axle and the shaft go around the dogs 30 that govern driving irons 26 also revolve and are thus drawn out of engagement with the cog wheels by centrifugal force and will thus not interfere with the free wheeling action. The spring 28 holds the irons 26 in position when the dogs 30 are out of engagement with the cog wheels.

Having thus described my invention, what I claim as new is:—

1. A device of the class described comprising a cylinder, a shaft rotatably arranged in the cylinder, means for driving the shaft, a pair of sectional shoes, spring means for normally holding the shoes out of engagement with the cylinder, forward and reverse driving wedge means connected with the shaft for forcing the shoes into engagement with the cylinder, spring members rotatably supported by the shaft for moving the wedge means outwardly into engagement with the shoes, and pawls slidably supported on a part of the cylinder for connecting the spring members to the cylinder when the cylinder is idle, and releasing the spring members when the cylinder is rotating.

2. A device of the class described comprising a cylinder, a shaft rotatably arranged in the cylinder, means for driving the shaft, a pair of sectional shoes, spring means for normally holding the shoes out of engagement with the cylinder, forward and reverse driving wedge means connected with the shaft for forcing the shoes into engagement with the cylinder, spring members, a cog wheel carrying the members and rotatably arranged on the shaft, dogs carried by the cylinder for engaging the teeth of the cog wheel when the cylinder is idle and moving out of engagement with the wheel when the cylinder is rotated and hooks on the wedge means engaging the spring members when the shaft is rotating in a direction to carry the spring members into engagement with the hooks.

3. A device of the class described comprising a sectional cylinder, a shaft rotatably arranged in the cylinder, means for driving the shaft, a pair of sectional shoes, in each section of the cylinder, spring means for normally holding the shoes out of engagement with the cylinder, a pair of reversely arranged wedge members connected with the shaft and located in each section of the cylinder for forcing the shoes into engagement with the cylinder, spring members in each cylinder section, a cog wheel carrying each set of members, dogs carried by the cylinder for engaging the teeth of the cog wheel, and hooks on the wedge members for engaging the spring members when the shaft is rotated in a direction towards the hooks.

4. A device of the class described comprising a cylinder formed of two sections, a wheel carrying shaft connected to the outer end of each section of the cylinder, a forward set of driving wedges for one shoe, a set of reverse driving wedges for the other shoe, supports on the shaft to which the wedges are pivoted, the reverse wedges being oppositely arranged to the forward wedges, a hook on each wedge, a set of driving irons in each cylinder section and supported on the shaft for rotary movement, said irons moving the forward wedges outwardly and engaging the hooks to move the reverse wedges inwardly when the shaft is rotated in a forward direction and said irons moving the forward wedges inwardly and the reverse wedges outwardly when the shaft is rotating in an opposite direction, and dogs carried by the cylinder and engaging teeth on the irons.

In testimony whereof I affix my signature.

CLARENCE E. SCHOENBORN.